(12) United States Patent
Funayama et al.

(10) Patent No.: US 8,492,000 B2
(45) Date of Patent: Jul. 23, 2013

(54) VULCANIZED RUBBER LAMINATE

(75) Inventors: Toshiyuki Funayama, Osaka (JP); Shigeru Shoji, Osaka (JP); Toyofumi Otaka, Osaka (JP)

(73) Assignee: Daiso Co., Ltd., Osaka-shi (JP)

( * ) Notice: Subject to any disclaimer, the term of this patent is extended or adjusted under 35 U.S.C. 154(b) by 270 days.

(21) Appl. No.: 12/864,489

(22) PCT Filed: Jan. 28, 2009

(86) PCT No.: PCT/JP2009/051362
§ 371 (c)(1),
(2), (4) Date: Jul. 23, 2010

(87) PCT Pub. No.: WO2009/096427
PCT Pub. Date: Aug. 6, 2009

(65) Prior Publication Data
US 2010/0297452 A1 Nov. 25, 2010

(30) Foreign Application Priority Data

Jan. 30, 2008 (JP) .................................. 2008-019355
Sep. 17, 2008 (JP) .................................. 2008-238217

(51) Int. Cl.
*B32B 25/04* (2006.01)
*B32B 25/14* (2006.01)

(52) U.S. Cl.
USPC ............................. 428/413; 428/420; 428/421

(58) Field of Classification Search
None
See application file for complete search history.

(56) References Cited

U.S. PATENT DOCUMENTS

| | | | |
|---|---|---|---|
| 4,154,911 A * | 5/1979 | Bak et al. ........................ | 524/161 |
| 6,346,300 B1 * | 2/2002 | Ruepping ...................... | 427/517 |
| 2003/0049399 A1 | 3/2003 | Noguchi et al. | |
| 2003/0118839 A1 | 6/2003 | Ikuta et al. | |
| 2004/0197510 A1 * | 10/2004 | Shifman ..................... | 428/36.91 |
| 2006/0216518 A1 * | 9/2006 | Funayama et al. ............. | 428/413 |

FOREIGN PATENT DOCUMENTS

| | | |
|---|---|---|
| EP | 0 545 368 A1 | 6/1993 |
| EP | 2 083 048 A1 | 7/2009 |
| JP | 61-174258 A | 8/1986 |
| JP | 4-372652 A | 12/1992 |
| JP | 5-214118 A | 8/1993 |
| JP | 2000-313769 A | 11/2000 |
| JP | 2000-344952 A | 12/2000 |
| JP | 2002-273826 A | 9/2002 |
| JP | 2003-268329 A | 9/2003 |
| JP | 2004-107540 A | 4/2004 |
| JP | 2006-272741 A | 10/2006 |
| JP | 2006-306053 A | 11/2006 |
| JP | 2007-223333 A | 9/2007 |
| JP | 2007-271077 A | 10/2007 |
| WO | WO 98/36901 A1 | 8/1998 |
| WO | WO 2008/050859 A1 | 5/2008 |

OTHER PUBLICATIONS

Office Action issued Aug. 31, 2012 in corresponding Chinese Patent Application No. 200980103708.7.

* cited by examiner

*Primary Examiner* — Ramsey Zacharia
(74) *Attorney, Agent, or Firm* — Knobbe Martens Olson & Bear LLP

(57) ABSTRACT

Disclosed is a vulcanized rubber laminate in which both an unvulcanized epichlorohydrin-based rubber composition layer containing a specific polyfunctional (meth)acrylate compound and a specific vulcanizing agent and an unvulcanized fluororubber composition layer containing a specific vulcanizing agent are heated and bonded, whereby, both rubber layers are firmly bonded. A vulcanized rubber laminate in which (A) an unvulcanized epichlorohydrin-based rubber composition layer and (B) an unvulcanized fluororubber composition layer are heated and bonded, wherein the unvulcanized epichlorohydrin-based rubber composition (A) contains: (1) a polyfunctional (meth)acrylate compound having two or more (meth) acryloyl groups in the molecule, and (2) at least one kind selected from the group consisting of a triazine-based vulcanizing agent, a thiourea-based vulcanizing agent, a quinoxaline-based vulcanizing agent and a bisphenol-based vulcanizing agent, and the unvulcanized fluororubber composition (B) contains an organic peroxide-based vulcanizing agent.

9 Claims, No Drawings

VULCANIZED RUBBER LAMINATE

This application is the U.S. National Phase under 35. U.S.C. §371 of International Application PCT/JP2009/051362, filed Jan. 28, 2009, which claims priority to Japanese Patent Application No. 2008-019355, filed Jan. 30, 2008 and Japanese Patent Application No. 2008-238217, filed Sep. 17, 2008. The International Application was published under PCT Article 21(2) in a language other than English.

TECHNICAL FIELD

The present invention relates to a vulcanized rubber laminate. More particularly, the present invention relates to a vulcanized rubber laminate in which a unvulcanized epichlorohydrin-based rubber composition layer containing a specific polyfunctional (meth)acrylate compound and a specific vulcanizing agent and an unvulcanized fluororubber composition layer containing a specific vulcanizing agent are heated and bonded, whereby, both rubber layers are firmly bonded.

BACKGROUND ART

Increase of engine room temperature, recycle of exhaust gas, and fuel evaporative emission regulation have recently progressed in view of exhaust gas control and energy saving of automobiles, and as a result, it has been required that rubber materials to be used therefor have thermal aging resistance, and resistance to weather, sour gasoline, alcohol-containing gasoline, and low fuel permeation, etc. Rubber materials, which sufficiently satisfy the above properties and can be used in fuel oil hoses, include fluororubbers. However, the fluororubbers are 10 to 20 times more expensive than common rubbers in terms of cost and disadvantageously poor in cold resistance. Thus, laminates having a thin inner layer of a fluororubber and an outer layer of an epichlorohydrin-based rubber have widely been used in the hoses for fuel oils such as gasoline instead of acrylonitrile-butadiene copolymer rubbers (NBR).

In the laminates of the fluororubber layers and epichlorohydrin-based rubber layers, vulcanizing agents for the fluororubbers have been selected from bisphenol-, polyamine-, or organic peroxide-based vulcanizing agents, etc. depending on the purpose of use, and now the use of organic peroxide-based vulcanizing agents is expanding because the fluororubbers using them are excellent in resistance to acid products due to decomposition of fuel oils and amine-based additives contained in the fuel oils.

In the above multilayer rubber hoses, adhesiveness between the different rubber layers is the most important subject. It is known that the fluororubber layer and epichlorohydrin-based rubber layer are poor in the adhesiveness to each other, and thus the rubbers are generally bonded by methods of adding certain additives to the epichlorohydrin-based rubbers or fluororubbers to improve adhesiveness.

Patent Document 1 discloses that adhesiveness is improved by adding, as an epichlorohydrin-based rubber composition, an organic peroxide-based or an amine-based vulcanizing agent and a specific phosphonium salt in a rubber laminate of a fluororubber and an epichlorohydrin-based rubber.

When the epichlorohydrin-based rubber is crosslinked by organic peroxide, ethylene dimethacrylate or the like is blended as a crosslinking aid for the purpose of improving the crosslinking effect. However, there has never been obtained a knowledge in which adhesiveness between the epichlorohydrin-based rubber crosslinked by the organic peroxide and the fluororubber is improved by blending ethylene dimethacrylate. It is known that since sufficient heat resistance of the epichlorohydrin-based rubber is not obtained by crosslinking by the organic peroxide, the addition of ethylene dimethacrylate is not suited for such applications (fuel oil hoses) that heat aging resistance is required.

Patent Document 2 discloses that, in a rubber laminate of a fluororubber and other kinds of rubbers, adhesiveness between the other kinds of rubbers and the rubber laminate is improved by using a composition which is prepared by blending an acrylic rubber obtained by copolymerizing a specific amount of a polyfunctional monomer with a fluororubber.

Patent Document 3 discloses that, in a rubber laminate of a fluororubber and an epichlorohydrin-based rubber, adhesiveness between the layers is improved by mixing a fluororubber containing an organic peroxide-based vulcanizing agent with triallyl isocyanurate, and that crack propagation resistance are improved by mixing ethylene glycol dimethacrylate as one polyfunctional (meth)acrylate compound with triallyl isocyanurate in a specific ratio.

Patent Document 4 proposes, as a method of improving adhesiveness between an epichlorohydrin-based rubber and a fluororubber containing an organic peroxide-based vulcanizing agent, a method of using an epichlorohydrin-based rubber containing 3 to 15 mol % of a constituent unit of allyl glycidyl ether.

Patent Document 1: JP-A-4-372652
Patent Document 2: JP-A-10-536475
Patent Document 3: JP-A-2007-271077
Patent Document 4: JP-A-2006-306053

DISCLOSURE OF THE INVENTION

Problems to be Solved by the Invention

However, sufficient adhesiveness between an epichlorohydrin-based rubber containing no allyl glycidyl ether constituent unit and a fluororubber containing an organic peroxide still cannot be obtained. Also when an epichlorohydrin-based rubber containing an allyl glycidyl ether constituent unit is used, high adhesiveness with the fluororubber is required. With the presence of the allyl glycidyl ether constituent unit in the epichlorohydrin-based rubber or otherwise, a rubber laminate having high adhesiveness is required.

Means for Solving the Problems

Thus, an object of the present invention is to provide a vulcanized rubber laminate in which both an unvulcanized epichlorohydrin-based rubber composition layer containing a specific polyfunctional (meth)acrylate compound and a specific vulcanizing agent and an unvulcanized fluororubber composition layer containing a specific vulcanizing agent are heated and bonded, whereby, both rubber layers are firmly bonded.

That is, the present invention is characterized in that a vulcanized rubber laminate in which (A) an unvulcanized epichlorohydrin-based rubber composition layer and (B) an unvulcanized fluororubber composition layer are heated and bonded, wherein the unvulcanized epichlorohydrin-based rubber composition (A) contains: (1) a polyfunctional (meth)acrylate compound having two or more (meth)acryloyl groups in the molecule, and (2) at least one kind selected from the group consisting of a triazine-based vulcanizing agent, a thiourea-based vulcanizing agent, a quinoxaline-based vulcanizing agent and a bisphenol-based vulcanizing agent, and the unvulcanized fluororubber composition (B) contains an organic peroxide-based vulcanizing agent.

Furthermore, it is preferred that the unvulcanized epichlorohydrin-based rubber composition (A) contain a compound of a salt of copper (3), and it is more preferred that the compound of a salt of copper (3) be a copper salt of carboxylic acid and/or a copper salt of dithiocarbamic acid.

It is preferred that the polyfunctional (meth)acrylate compound (1) has three or more (meth)acryloyl groups in the molecule.

It is preferred that the triazine-based vulcanizing agent is 2,4,6-trimercapto-s-triazine.

It is preferred that the thiourea-based vulcanizing agent is 2-mercaptoimidazoline (ethylene thiourea).

It is preferred that the quinoxaline-based vulcanizing agent is 6-methylquinoxaline-2,3-dithiocarbonate.

It is preferred that the bisphenol-based vulcanizing agent is bisphenol AF and/or bisphenol S.

It is preferred that a fluororubber of the unvulcanized fluororubber composition (B) contains a copolymer of vinylidene fluoride and other copolymerizable fluorine-containing olefin, and the fluorine-containing olefin is at least one kind selected from the group consisting of hexafluoropropene, pentafluoropropene, trifluoroethylene, trifluorochloroethylene, tetrafluoroethylene, vinyl fluoride, perfluoromethyl vinyl ether and perfluoropropyl vinyl ether.

In the laminate of an epichlorohydrin-based rubber and a fluororubber containing an organic peroxide-based vulcanizing agent, by mixing the epichlorohydrin-based rubber with a polyfunctional (meth)acrylate compound having two or more (meth)acryloyl groups in the molecule and the specific vulcanizing agent, sufficient adhesiveness with the fluororubber can be obtained even when an epichlorohydrin-based rubber, which does not contain allyl glycidyl ether as a constituent unit. Even when an epichlorohydrin-based rubber containing allyl glycidyl ether as a constituent unit is used, adhesiveness can be remarkably improved, and therefore it is effective.

DETAILED DESCRIPTION OF THE PREFERRED EMBODIMENTS

The present invention will be described in detail below.

Examples of the epichlorohydrin-based rubber in the unvulcanized epichlorohydrin-based rubber composition (A) of the present invention include an epichlorohydrin homopolymer, an epichlorohydrin-ethylene oxide copolymer, an epichlorohydrin-propylene oxide copolymer, an epichlorohydrin-ethylene oxide-allyl glycidyl ether terpolymer and an epichlorohydrin-ethylene oxide-propylene oxide-allyl glycidyl ether quadripolymer. Among these rubbers, an epichlorohydrin homopolymer, an epichlorohydrin-ethylene oxide copolymer and an epichlorohydrin-ethylene oxide-allyl glycidyl ether terpolymer are preferable, and an epichlorohydrin-ethylene oxide copolymer and an epichlorohydrin-ethylene oxide-allyl glycidyl ether terpolymer are more preferable.

In the case of the copolymer, for example, the copolymerization proportion of epichlorohydrin is preferably from 5 mol % to 95 mol %, more preferably from 10 mol % to 75 mol %, and still more preferably from 10 mol % to 65 mol %. The copolymerization proportion of ethylene oxide is preferably from 5 mol % to 95 mol %, more preferably from 25 mol % to 90 mol %, and still more preferably from 35 mol % to 90 mol %. The copolymerization proportion of allyl glycidyl ether is preferably from 0 mol % to 10 mol %, more preferably from 1 mol % to 8 mol %, and still more preferably from 1 mol % to 7 mol %. Although there is no particular limitation on molecular weight of these homopolymer or copolymers, they usually have Mooney viscosity $ML_{1+4}$ (100° C.) of about 30 to about 150.

Specific examples of the polyfunctional (meth)acrylate compound having two or more (meth)acryloyl groups in the molecule (1) include difunctional (meth)acrylate compounds such as 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, neopentyl glycol di(meth)acrylate, tricyclodecane dimethanol di(meth)acrylate and tripropylene glycol di(meth)acrylate. Examples of the trifunctional (meth)acrylate compound include trimethylolpropane tri(meth)acrylate, ethoxylated trimethylolpropane tri(meth)acrylate, propoxylated trimethylolpropane tri(meth)acrylate, pentaerythritol tri(meth)acrylate, ethoxylated isocyanuric acid tri(meth)acrylate. Examples of the tetrafunctional (meth)acrylate compound include ditrimethlolpropane tetra(meth)acrylate, pentaerythritol tetra(meth)acrylate, ethoxylated pentaerythritol tetra(meth)acrylate, propoxylated pentaerythritol tetra(meth)acrylate and ditrimethylolpropane tetra(meth)acrylate. Examples of the pentafunctional or higher functional (meth)acrylate compound include pentaerythritol tri(meth)acrylate, pentaerythritol hexa(meth)acrylate, dipentaerythritol hexa(meth)acrylate, dipentaerythritol monohydroxypenta(meth)acrylate and caprolactone-modified dipentaerythritol hexa(meth)acrylate. It is also possible to use urethane (meth)acrylate and epoxy (meth)acrylate each having two or more (meth)acryloyl groups in the molecule. The (meth)acryloyl group means an acryloyl group and/or a methacryloyl group, while the (meth)acrylate means acrylate and/or methacrylate.

The polyfunctional (meth)acrylate compound having two or more (meth)acryloyl groups in the molecule (1) is preferably a polyfunctional (meth)acrylate compound having a trifunctional or higher functional (meth)acryloyl group in the molecule, and particularly preferably trimethylolpropane tri(meth)acrylate, pentaerythritol tri(meth)acrylate, pentaerythritol tetra(meth)acrylate, pentaerythritol hexa(meth)acrylate, dipentaerythritol hexa(meth)acrylate or ditrimethylolpropane tetra(meth)acrylate. These polyfunctional (meth)acrylate compounds may be used alone, or two or more kinds thereof may be used in combination. Actually, commercially available products such as NK Ester Series manufactured by Shin-Nakamura Chemical Co., Ltd.; Light Ester Series manufactured by KYOEISHA CHEMICAL Co., Ltd. and ARONIX series manufactured by Toagosei Co., Ltd. can be used.

The amount of the polyfunctional (meth)acrylate compound having two or more (meth)acryloyl groups in the molecule (1) to be added is preferably from 0.1 to 30 parts by weight, more preferably from 0.5 to 15 parts by weight, and still more preferably from 1 to 10 parts by weight, based on 100 parts by weight of the epichlorohydrin-based rubber. When the amount is less than 0.1 parts by weight, less effect of improving adhesiveness is exerted. In contrast, when the amount is more than 30 parts by weight, an elastic modulus of the vulcanized product may decrease.

As the vulcanizing agent (2) used in the present invention, at least one kind selected from the group consisting of a quinoxaline-based vulcanizing agent, a thiourea-based vulcanizing agent, a triazine-based vulcanizing agent and a bisphenol-based vulcanizing agent is used.

Examples of the quinoxaline-based vulcanizing agent include 2,3-dimercaptoquinoxaline, quinoxaline-2,3-dithiocarbonate, 6-methylquinoxaline-2,3-dithiocarbonate and 5,8-dimethylquinoxaline-2,3-dithiocarbonate.

Examples of the thiourea-based vulcanizing agent include 2-mercaptoimidazoline, 1,3-diethyl thiourea, 1,3-dibutyl thiourea and trimethyl thiourea.

Examples of the triazine-based vulcanizing agent include 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine and 1-phenylamino-3,5-dimercaptotriazine, and 2,4,6-trimercapto-s-triazine is preferable.

Examples of the bisphenol-based vulcanizing agent include bisphenol AF and bisphenol S.

Preferred examples of the vulcanizing agent include 2,4,6-trimercapto-s-triazine, 2-mercaptoimidazoline (ethylenethiourea), 6-methylquinoxaline-2,3-dithiocarbonate, bisphenol AF and bisphenol S, and 6-methylquinoxaline-2,3-dithiocarbonate is particularly preferable. Two or more kinds of these vulcanizing agents may be used in combination as long as the effects of the present invention are not adversely affected.

The amount of the vulcanizing agent to be added is 0.1 to 10 parts by weight, and preferably from 0.3 to 5 parts by weight, based on 100 parts by weight of the epichlorohydrin-based rubber. When the amount is less than 0.1 parts by weight, sufficient crosslinking is not achieved. In contrast, when the amount is more than 10 parts by weight, the vulcanized product may become too rigid to obtain usually desired physical properties of the vulcanized epichlorohydrin-based rubber.

In the present invention, known vulcanization accelerators and retarders, which are usually used in combination with these vulcanizing agents, can be used.

Examples of the vulcanization accelerator include sulfur, morpholine sulfides, amines, salts of weak acid of amine, basic silica, quaternary ammonium salts, quaternary phosphonium salts, alkali metal salts of fatty acid, thiuram sulfides, polyfunctional vinyl compounds, mercaptobenzothiazoles, sulfenamides and dithiocarbamates. Examples of particularly preferable accelerator when the quinoxaline-based vulcanizing agent is applied to the composition of the present invention include 1,8-diazabicyclo (5,4,0)undecene-7 (hereinafter abbreviated to DBU) salts, 1,5-diazabicyclo (4,3,0)nonene-5 (hereinafter abbreviated to DBN) salts, basic silica, and alkali metal salts of fatty acid.

Examples of the DBU salts include DBU carbonates, DBU-stearates, DBU-2-ethylhexanates, DBU-benzoates, DBU-salicylates, DBU-3-hydroxy-2-naphthoates, DBU-phenol resin salts, DBU-2-mercaptobenzothiazole salts and DBU-2-mercapto benzimidazole salts. Examples of the DBN salts include DBN-carbonates, DBN-stearates, DBN-2-ethylhexanates, DBN-benzoates, DBN-salicylates, DBN-3-hydroxy-2-naphthoates, DBN-phenol resin salts, DBN-2-mercaptobenzothiazole salts and DBN-2-mercaptobenzimidazole salts. When these DBU salts and/or DBN salts are used as accelerators, the amount of them to be added are preferably from 0.1 to 5 parts by weight, and more preferably from 0.5 to 3 parts by weight, based on 100 parts by weight of the epichlorohydrin-based rubber.

The basic silica is silica containing sodium with a pH of 9 to 13 and, when the basic silica is used as the accelerator, the amount thereof is preferably from 2 to 30 parts by weight, and more preferably from 5 to 20 parts by weight, based on 100 parts by weight of the epichlorohydrin-based rubber.

Examples of the alkali metal salts of fatty acid include alkali metal salts of higher fatty acid, resin acid and naphthenic acid, and alkali metal salts of higher fatty acid having 6 or more carbon atoms are more preferable. Specific examples thereof include sodium salts and potassium salts of semihardened beef tallow fatty acid, stearic acid, oleic acid, sebacic acid and castrol oil. Examples of preferable salt include semihardened beef tallow fatty acid sodium salts, sodium stearate, semihardened beef tallow fatty acid potassium salts and potassium stearate, and sodium stearate and/or potassium stearate are more preferable. In particular, sodium salts such as semihardened beef tallow fatty acid sodium salts and sodium stearate are preferably used because storage stability is satisfactory. When these alkali metal salts of fatty acid are used as the accelerator, the amount thereof is preferably from 0.2 to 10 parts by weight, and more preferably from 0.5 to 7 parts by weight, based on 100 parts by weight of the epichlorohydrin-based, rubber.

Examples of the retarders include N-cyclohexylthiophthalimide, phthalic anhydride, an organic zinc compound and acidic silica. The amount of the retarder to be added is preferably from 0 to 10 parts by weight, and more preferably from 0.1 to 5 parts by weight, based on 100 parts by weight of the epichlorohydrin-based rubber.

The vulcanized rubber laminate of the present invention preferably contains, in addition to the unvulcanized epichlorohydrin-based rubber composition (A) containing an epichlorohydrin-based rubber, a specific polyfunctional acrylate compound and a specific vulcanizing agent, the compound of a salt of copper (3) so as to improve adhesiveness. It is more preferred that the compound of a salt of copper (3) be a copper salt of carboxylic acid and/or a copper salt of dithiocarbamic acid. It is still more preferred that the copper salt of dithiocarbamic acid be a copper salt of alkyl dithiocarbamic acid. It is particularly preferred that the copper salt of alkyl dithiocarbamic acid be a copper salt of dialkyl dithiocarbamic acid. The alkyl group preferably has 1 to 10 carbon atoms.

Examples of the copper salt of carboxylic acid include, but are not limited to, copper acetate, copper benzoate, copper maleate, copper stearate, copper palmitate, copper laurate, copper naphthenate and copper terephthalate, and it is particularly preferred to use copper stearate.

Examples of the copper salt of dithiocarbamic acid include, but are not limited to, copper dimethyldithiocarbamate, copper diethyldithiocarbamimate, copper dibutyldithiocarbamate, copper N-ethyl-N-phenyldithiocarbamate, copper N-pentamethylenedithiocarbamate and copper dibenzyldithiocarbamate, and it is particularly preferred to use copper dimethyldithiocarbamate, copper diethyldithiocarbamate and copper dibutyldithiocarbamate. Although the copper salt of dithiocarbamic acid is usually used as a vulcanization accelerator and an antioxindant, the effect as a tackifier can also be expected in the present invention and it is effective.

The amount of the copper salt of carboxylic acid and/or the copper salt of dithiocarbamic acid to be added is preferably from 0.01 to 0.5 parts by weight, more preferably from 0.02 to 0.4 parts by weight, and particularly preferably from 0.05 to 0.3 parts by weight, based on 100 parts by weight of the epichlorohydrin-based rubber. When the amount is less than 0.01 parts by weight, less effect of improving adhesiveness is exerted. In contrast, when the amount is more than 0.5 parts by weight, resistance to ozone of the vulcanized product drastically deteriorate, and therefore it is not preferred.

The unvulcanized epichlorohydrin-based rubber composition (A) used in the present invention can be blended with a metal compound and/or an inorganic microporous crystal, which serve as an acid acceptor, in view of vulcanization rate control and thermal stability of the vulcanized product. Examples of the metal compound include oxides, hydroxides, carbonates, carboxylates, silicates, borates and phosphites of metals of Group II of the Periodic Table, and oxides, basic carbonates, basic carboxylates, basic phosphites, basic sulfites and tribasic sulfates of metals of Group IVA of the Periodic Table.

Specific examples of the metal compound used as the acid acceptor include magnesia, magnesium hydroxide, barium hydroxide, magnesium carbonate, barium carbonate, sodium carbonate, lime, slaked lime, calcium carbonate, calcium silicate, calcium stearate, zinc stearate, calcium phthalate, calcium phosphite, zinc white, tin oxide, litharge, red lead, white lead, bibasic lead phthalate, bibasic lead carbonate, basic lead silicate, tin stearate, basic lead phosphite, basic tin phosphite, basic lead sulfite and tribasic lead sulfate. Particularly preferred acid acceptors include magnesia, calcium carbonate, slaked lime, lime and sodium carbonate.

The inorganic microporous crystal means a porous crystalline material which can be distinguished clearly from porous amorphous materials such as silica gel and alumina. Examples of the inorganic microporous crystal include zeolites, an aluminophosphate type molecular sieve, a layered silicate, a synthetic hydrotalcite and an alkaline metal titanate salt. The acid acceptor is particularly preferably a synthetic hydrotalcite.

Examples of the zeolites include natural zeolites, A-, X-, or Y-type synthetic zeolites, sodalites, natural or synthetic mordenites, ZSM-5, and metal-substituted derivatives thereof, and they may be used alone, or two or more kinds thereof may be used in combination. The metal of the metal-substituted derivative is generally sodium. The zeolites preferably have a large acid acceptability, and are preferably an A-type zeolite.

The synthetic hydrotalcite is represented by the following general formula (1):

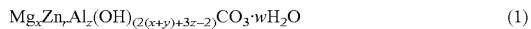

$$Mg_xZn_yAl_z(OH)_{(2(x+y)+3z-2)}CO_3 \cdot wH_2O \quad (1)$$

wherein x and y are real numbers satisfying the relation of x+y=1 to 10, z is a real number of 1 to 5, and w is a real number of 0 to 10.

Examples of the hydrotalcites represented by the general formula (1) include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot 3.5H_2O$ and $Mg_3ZnAl_2(OH)_{12}CO_3$.

The amount of the acid acceptor to be added is preferably from 0.2 to 50 parts by weight, more preferably from 0.5 to 50 parts by weight, and particularly from 1 to 20 parts by weight, based on 100 parts by weight of the epichlorohydrin-based rubber. When the amount is less than the above range, sufficient crosslinking cannot be achieved. In contrast, when the amount is more than the above range, the vulcanized product may become too rigid to obtain usually desired physical properties of the vulcanized epichlorohydrin-based rubber.

The unvulcanized epichlorohydrin-based rubber composition (A) used in the present invention may contain, in addition to the acid acceptors, additives used commonly in this field, such as antioxidants, fillers, reinforcing agents, plasticizers, processing aids, pigments and flame retardants.

The fluororubber in the unvulcanized fluororubber composition (B) is preferably a highly fluorinated elastic copolymer such as a copolymer of vinylidene fluoride and another copolymerizable fluorine-containing olefin. Examples of the fluorine-containing olefins include hexafluoropropene, pentafluoropropene, trifluoroethylene, trifluorochloroethylene, tetrafluoroethylene, vinyl fluoride, perfluoro(methyl vinyl ether), and perfluoro(propyl vinyl ether), and one or more kinds of them may be used as a copolymerization component.

Preferred examples of the fluororubbers include vinylidene fluoride-hexafluoropropene copolymers and vinylidene fluoride-tetrafluoroethylene-hexafluoropropene terpolymers.

The unvulcanized fluororubber composition (B) used in the present invention contains an organic peroxide-based vulcanizing agent. Examples of the organic peroxide-based vulcanizing agents include tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy) hexane, benzoyl peroxide, and tert-butyl peroxybenzoate.

The amount of the vulcanizing agent to be used may be appropriately determined depending on the purpose of use, and is preferably from 0.1 to 5 parts by weight, and more preferably from 0.2 to 4 parts by weight. When the amount is less than 0.1 parts by weight, sufficient crosslinking cannot be achieved. In contrast, when the amount is more than 5 parts by weight, the vulcanized product may become too rigid to obtain usually desired physical properties of the vulcanized fluororubber.

The fluororubber composition may further contain, in addition to the vulcanizing agent selected from the above organic peroxides, known additives such as vulcanization accelerators, metal acid acceptor compounds, stabilizers, reinforcing agents, fillers, coloring agents, processing aids and plasticizers. In the present invention, the content of the additive is not restricted, and the vulcanized fluororubber composition containing any organic peroxide-based vulcanizing agent according to the purpose of use can be used.

Examples of the method of producing the laminate of the present invention include a method in which both rubber compositions are laminated by co-extrusion or successive extrusion and then heat-vulcanized or vulcanization-molded, or a method in which both rubber compositions are laminated and thermally vulcanization-molded using a mold at the same time. It is also possible to employ a method in which the laminate may be produced such that one of the rubber compositions is heat-vulcanized slightly while keeping a desired shape, and then the compositions are laminated and sufficiently vulcanization-molded thermally. As the method of heat vulcanizing the laminate laminated by the extrusion, a known method using a steam can, air bath, infrared rays, microwave, lead sheathing vulcanization, etc. can be optionally employed. In the vulcanization, the heating temperature is usually from 100 to 200° C., and the heating time may be selected depending on the temperature and is usually from 0.5 to 300 minutes.

Typical examples of the aspect when the laminate of the present invention is applied to fuel oil hoses include two-layered hoses having an inner layer of the fluororubber and an outer layer of the epichlorohydrin-based rubber, three-layered hose having a braided reinforcing layer on the outer layers, and four-layered hose further having a rubber layer thereon. A braided material for the three- or four-layered hose may comprise a polyester fiber, a polyamide fiber, a glass fiber, a vinylon fiber, cotton, etc. The outermost rubber layer of the four-layered hose generally contains a synthetic rubber having aging resistance, resistance to weather and oil, such as an epichlorohydrin-based rubber, an ethylene-acrylate rubber, a chloroprene rubber, a chlorinated polyethylene rubber or chlorosulfonated polyethylene.

The vulcanized rubber laminate thus obtained of the present invention is extremely excellent in adhesiveness between the vulcanized rubber layers, and the vulcanized rubber layers are firmly bonded. Thus, the laminate is remarkably useful for such applications that one surface needs to have resistance to sour gasoline, gasoline permeation, alcohol-containing gasoline, etc. and the other surface needs to have thermal aging resistance, resistance to weather, gasoline, etc., such as fuel hoses and filler hoses.

EXAMPLES

The present invention will be described below with reference to Examples as typical examples without intention of restricting the scope of the invention.

Examples 1 to 16

Comparative Examples 1 to 7

Each of epichlorohydrin-based rubber compositions shown in Tables 1 and 2 was kneaded with a kneader and an open roll to obtain a sheet (i) having a thickness of 2 to 2.5 mm. A fluororubber composition shown in Table 3 was kneaded in the same manner to prepare a sheet (ii) having a thickness of 1 to 1.5 mm. The sheets (i) and (ii) were laminated to each other and pressed at 160° C. for 30 minutes under 20 to 25 kg/cm$^2$ to obtain a vulcanized rubber laminate having a thickness of 3.5 to 4.0 mm.

(Evaluation of Adhesiveness)

The obtained laminate was cut into a strip measuring 2.5×10 cm to prepare an adhesiveness test sample. The sample was subjected to T-peel test at 25° C. at a peeling rate of 50 mm/min, and then the peel strength (N/cm) was measured. The peeling state was visually observed. Evaluation criteria are shown below and the evaluation results are shown in Table 4. Excellent (⊙): Layers were firmly bonded, and rubber breaking was caused therebetween.
Good (○): Peeling strength was relatively good, while rubber breaking was not caused.
Bad (Δ): Layers were bonded under small peeling strength, and peeling was caused at boundary.
Poor (x): Layers were not bonded at all, and peeling was caused at boundary.

Components used in Examples and Comparative Examples are as follows.

1: "Epichlorohydrin-ethylene oxide comopolymer (mole ratio 49:51)" manufactured by Daiso Co., Ltd.
2: "Epichlorohydrin homopolymer" manufactured by Daiso Co., Ltd.
3: "Epichlorohydrin-ethylene oxide-allyl glycidyl ether terpolymer (mole ratio 52:41:7)" manufactured by Daiso Co., Ltd.
4: "DHT-4A" manufactured by Kyowa Chemical Industry Co., Ltd.
5: "P-152" manufactured by Daiso Co., Ltd.
6: "NK Ester HD-N" manufactured by Shin-Nakamura Chemical Co., Ltd.
7: "NK Ester TMPT" manufactured by Shin-Nakamura Chemical Co., Ltd.
8: "NK Ester A-TMPT" manufactured by Shin-Nakamura Chemical Co., Ltd.
9: "Light Acrylate PE-3A" manufactured by KYOEISHA CHEMICAL Co., Ltd.
10: "Light Acrylate PE-4A" manufactured by KYOEISHA CHEMICAL Co., Ltd.
11: "ARONIX M-404" manufactured by Toagosei Co., Ltd.
12: "DynamarRC5251Q" manufactured by 3M
13: "DynamarFC5157" manufactured by 3M
14: "DynamarFC5166" manufactured by 3M
15: "DAIEL G902" manufactured by Daikin Industries, Ltd.
16: "Perhexa 2.5B-40" manufactured by Nippon Oil & Fats Co., Ltd.
17: "TAIC" manufactured by Nippon Kasei Chemical Company Limited.
18: "Daiso DAP100 monomer" manufactured by Daiso Co., Ltd.

TABLE 1

Formulation Table of epichlorohydrin-based rubber composition (Examples 1 to 12)

| Unit: Parts by weight | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| ECH-EO copolymer*1 | 100 | 100 | 100 | 100 | 100 | 100 | 100 | 100 | 100 | 100 | 100 | |
| ECH homopolymer*2 | | | | | | | | | | | | 100 |
| FEF carbon black (reinforcing agent) | 50 | 50 | 50 | 50 | 50 | 50 | 50 | 50 | 50 | 50 | 50 | 50 |
| Di (butoxyethoxy) ethyl adipate (plasticizer) | 10 | 10 | 10 | 10 | 10 | 10 | 10 | 10 | 10 | 10 | 10 | 10 |
| 2-mercaptobenzoimidazole (antioxidant) | 0.3 | 0.3 | 0.3 | 0.3 | 0.3 | 0.3 | 0.3 | 0.3 | 0.3 | 0.3 | 0.3 | 0.3 |
| Copper dimethyldithiocarbamate (antioxidant, tackifier) | 0.1 | 0.1 | 0.1 | 0.1 | 0.1 | | | | 0.1 | 0.1 | 0.1 | 0.1 |
| Copper diethyldithiocarbamate (antioxidant, tackifier) | | | | | | | 0.1 | | | | | |
| Copper dibutyldithiocarbamate (antioxidant, tackifier) | | | | | | | | 0.1 | | | | |
| Sorbitan monostearate (lubricant) | 3 | 3 | 3 | 3 | 3 | 3 | 3 | 3 | 3 | 3 | 3 | 3 |
| Magnesium oxide (acid acceptor) | 3 | 3 | 3 | 3 | 3 | 3 | 3 | 3 | 3 | 3 | 3 | 3 |
| Synthetic hydrotalcite (acid acceptor)*4 | 3 | 3 | 3 | 3 | 3 | 3 | 3 | 3 | 3 | 3 | 3 | 3 |
| Phenol resin salt of DBU (accelerator)*5 | 1 | 1 | 1 | 1 | 1 | 1 | 1 | 1 | 1 | 1 | 1 | 1 |
| 1,6-hexanediol dimethacrylate (tackifier)*6 | 5 | | | | | | | | | | | |

TABLE 1-continued

Formulation Table of epichlorohydrin-based rubber composition (Examples 1 to 12)

| Unit: Parts by weight | 1 | 2 | 3 | 4 | 5 | 6 | 7 | 8 | 9 | 10 | 11 | 12 |
|---|---|---|---|---|---|---|---|---|---|---|---|---|
| Trimethylolpropane trimethacrylate (tackifier)*7 | | 5 | 10 | | | | | | | | | |
| Trimethylolpropane triacrylate (tackifier)*8 | | | | 5 | | | | | | | | |
| Pentaerythritol triacrylate (tackifier)*9 | | | | | 5 | 5 | 5 | 5 | | | | 5 |
| Pentaerythritol hexaacrylate (tackifier)*10 | | | | | | | | | 5 | | | |
| Dipentaerythritol hexaacrylate (tackifier)*11 | | | | | | | | | | 5 | 3 | |
| Zinc N-pentamethylene dithiocarbamate (retarder) | 0.5 | 0.5 | 0.5 | 0.5 | 0.5 | 0.5 | 0.5 | 0.5 | 0.5 | 0.5 | 0.5 | 0.5 |
| N-cyclohexylphthalimide (retarder) | 1 | 1 | 1 | 1 | 1 | 1 | 1 | 1 | 1 | 1 | 1 | 1 |
| 6-methylquinoxaline-2,3-dithiocaronate (vulcanizer) | 1.7 | 1.7 | 1.7 | 1.7 | 1.7 | 1.7 | 1.7 | 1.7 | 1.7 | 1.7 | 1.7 | 1.7 |

TABLE 2

Formulation Table of epichlorohydrin-based rubber composition (Examples 13 to 16, Comparative Examples 1 to 7)

| Unit: Parts by weight | Example 13 | Example 14 | Example 15 | Example 16 | Comparative 1 | Comparative 2 | Comparative 3 | Comparative 4 | Comparative 5 | Comparative 6 | Comparative 7 |
|---|---|---|---|---|---|---|---|---|---|---|---|
| ECH-EO copolymer*1 | 100 | 100 | 100 | | 100 | 100 | 100 | 100 | 100 | 100 | |
| ECH-EO-AGE terpolymer rubber*3 | | | | 100 | | | | | | | 100 |
| FEF carbon black (reinforcing agent) | 50 | 50 | 50 | 50 | 50 | 50 | 50 | 50 | 50 | 50 | 50 |
| Di(butoxyethoxy) ethyl adipate (plasticizer) | 10 | 10 | 10 | 10 | 10 | 10 | 10 | 10 | 10 | 10 | 10 |
| 2-mercaptobenzoimidazole (antioxidant) | 0.3 | 0.3 | 0.3 | 0.3 | 0.3 | 0.3 | 0.3 | 0.3 | 0.3 | 0.3 | 0.3 |
| Copper dimethyldithiocarbamate (antioxidant, tackifier) | 0.1 | 0.1 | 0.1 | 0.1 | 0.1 | 0.1 | 0.1 | 0.1 | 0.1 | 0.1 | 0.1 |
| Sorbitan monostearate (lubricant) | 3 | 3 | 3 | 3 | 3 | 3 | 3 | 3 | 3 | 3 | 3 |
| Magnesium oxide (acid acceptor) | 3 | 3 | | 3 | 3 | 3 | 3 | 3 | | | 3 |
| Calcium carbonate (acid acceptor) | | 5 | | | | | | | 5 | | |
| Sodium carbonate (acid acceptor)*12 | | | 12 | | | | | | | 12 | |
| Phenol resin salt of DBU (accelerator)*5 | | | | 1 | 1 | 1 | 1 | | | | |
| Pentaerythritol triacrylate (tackifier)*9 | 5 | 5 | 5 | 5 | | | | | | | |
| Triallyl isocyanurate*17 | | | | | | | 5 | | | | |
| Diallyl isophthalate monomer*18 | | | | | | | | 5 | | | |
| Sulfur (accelerator) | 0.1 | | | | | | | 0.1 | | | |
| N-cyclohexylbenzothiazole-2-sulfenamide (retarder) | 1 | | | | | | | 1 | | | |
| Ethylene urea (vulcanizing agent) | 12 | | | | | | | 12 | | | |
| Zinc N-pentamethylene dithiocarbamate (accelerator) | | 0.5 | | 0.5 | 0.5 | 0.5 | 0.5 | | 0.5 | | 0.5 |
| N-cyclohexylthiophthalimide (retarder) | | 1 | | 1 | 1 | 1 | 1 | | 1 | | 1 |
| 2,4,6-trimercapto-s-triazine (vulcanizing agent) | | 1 | | | | | | | 1 | | |

TABLE 2-continued

Formulation Table of epichlorohydrin-based rubber composition
(Examples 13 to 16, Comparative Examples 1 to 7)

| Unit: Parts by weight | Example | | | | Comparative example | | | | | | |
|---|---|---|---|---|---|---|---|---|---|---|---|
| | 13 | 14 | 15 | 16 | 1 | 2 | 3 | 4 | 5 | 6 | 7 |
| Quaternary phosphonium salt (accelerator)*13 | | 0.5 | | | | | | | | 0.5 | |
| Bisphenol S (vulcanizing agent)*14 | | 2 | | | | | | | | 2 | |
| 6-methylquinoxaline-2,3-dithiocaronate (vulcanizer) | | | 1.7 | 1.7 | 1.7 | 1.7 | 1.7 | | | | 1.7 |

TABLE 3

Formulation Table of fluororubber composition

| | Parts by weight |
|---|---|
| Fluororubber*15 | 100 |
| N-990 carbon | 20 |
| Triallyl isocyanurate | 3 |
| 2,5-dimethyl-2,5-di(tert-butylperoxy)hexane*16 | 2.5 |

As is apparent from evaluation results shown in Table 4, when the vulcanized rubber laminates containing an epichlorohydrin-based rubber containing allyl glycidyl ether as a constituent unit of Examples 1 to 16 are compared with those of Comparative Examples 1 to 6, the layers were peeled off at the adhesiveness surface in all vulcanized rubber laminates containing no polyfunctional (meth)acrylate compound of Comparative Examples 1 to 6 and the vulcanized rubber laminates have low peel strength. In contrast, in the vulcanized rubber laminates containing the polyfunctional (meth)

TABLE 4

Evaluation results of adhesiveness between both vulcanized rubbers

| | Example 1 | Example 2 | Example 3 | Example 4 | Example 5 | Example 6 |
|---|---|---|---|---|---|---|
| Peeling strength (N/cm) | 20 | 21 | 39 | 28 | 70 | 58 |
| Peeling state | ○ | ○ | ⊙ | ⊙ | ⊙ | ⊙ |

| | Example 7 | Example 8 | Example 9 | Example 10 | Example 11 | Example 12 |
|---|---|---|---|---|---|---|
| Peeling strength (N/cm) | 63 | 35 | 56 | 43 | 30 | 25 |
| Peeling state | ⊙ | ⊙ | ⊙ | ⊙ | ⊙ | ○ |

| | Example 13 | Example 14 | Example 15 | Example 16 | Comparative example 1 | Comparative example 2 |
|---|---|---|---|---|---|---|
| Peeling strength (N/cm) | 42 | 25 | 27 | 85 | 5 | 5 |
| Peeling state | ⊙ | ○ | ⊙ | ⊙ | Δ | Δ |

| | Comparative example 3 | Comparative example 4 | Comparative example 5 | Comparative example 6 | Comparative example 7 |
|---|---|---|---|---|---|
| Peeling strength (N/cm) | 5 | 0 | 3 | 9 | 20 |
| Peeling state | Δ | X | Δ | Δ | ○ |

<Peeling state>
The peeling state was evaluated as follows.
Excellent (⊙): Layers were firmly bonded, and rubber breaking was caused therebetween.
Good (○): Peeling strength was relatively good, while rubber breaking was not caused.
Bad (Δ): Layers were bonded under small peeling strength, and peeling was caused at boundary.
Poor (X): Layers were not bonded at all, and peeling was caused at boundary.

acrylate compound of Examples 3 to 11, 13, 15 and 16 are extremely excellent in adhesiveness between the vulcanized rubbers and the layers are not peeled off at the adhesiveness surface, and thus it could be confirmed that the adhesiveness surface is firm. In Examples 1, 2, 12 and 14, peel strength itself was good, although the layers are peeled off at the adhesiveness surface.

When the vulcanized rubber laminate containing an epichlorohydrin-based rubber containing allyl glycidyl ether as a constituent unit of Example 16 is compared with that of Comparative Example 7, the peel strength of the vulcanized rubber laminate containing the polyfunctional (meth)acrylate compound of Example 16 remarkably increased as compared with that containing no polyfunctional (meth)acrylate compound of Comparative Example 5, and thus apparent improvement in adhesiveness could be confirmed.

INDUSTRIAL APPLICABILITY

The vulcanized rubber laminate of the present invention has the above-mentioned constitution, so that the vulcanized rubber layers are firmly bonded with remarkably excellent adhesiveness. Thus, the laminate is remarkably useful for such applications that one surface needs to have resistance to sour gasoline, gasoline permeation, alcohol-containing gasoline, etc. and the other surface needs to have thermal aging resistance, resistance to weather, gasoline, etc., such as fuel hoses and filler hoses.

The invention claimed is:

1. A vulcanized rubber laminate in which (A) an unvulcanized epichlorohydrin-based rubber composition layer and (B) an unvulcanized fluororubber composition layer are heated and bonded, wherein
   the unvulcanized epichlorohydrin-based rubber composition (A) contains:
   (1) a polyfunctional (meth)acrylate compound having two or more (meth)acryloyl groups in the molecule, the amount of said polyfunctional (meth)acrylate compound is 1 to 15 parts by weight relative to 100 parts by weight of the epichlorohydrin-based rubber, and
   (2) at least one kind selected from the group consisting of a triazine-based vulcanizing agent, a thiourea-based vulcanizing agent, a quinoxaline-based vulcanizing agent and a bisphenol-based vulcanizing agent, and
   the unvulcanized fluororubber composition (B) contains an organic peroxide-based vulcanizing agent.

2. The vulcanized rubber laminate according to claim 1, wherein the unvulcanized epichlorohydrin-based rubber composition (A) further contains (3) a compound of a salt of copper.

3. The vulcanized rubber laminate according to claim 2, wherein the compound of a salt of copper (3) is a copper salt of carboxylic acid and/or a copper salt of dithiocarbamic acid.

4. The vulcanized rubber laminate according to claim 1, wherein the polyfunctional (meth)acrylate compound (1) has three or more (meth)acryloyl groups in the molecule.

5. The vulcanized rubber laminate according to claim 1, wherein the triazine-based vulcanizing agent is 2,4,6-trimercapto-s-triazine.

6. The vulcanized rubber laminate according to claim 1, wherein the thiourea-based vulcanizing agent is 2-mercaptoimidazoline (ethylene thiourea).

7. The vulcanized rubber laminate according to claim 1, wherein the quinoxaline-based vulcanizing agent is 6-methylquinoxaline-2,3-dithiocarbonate.

8. The vulcanized rubber laminate according to claim 1, wherein the bisphenol-based vulcanizing agent is bisphenol AF and/or bisphenol S.

9. The vulcanized rubber laminate according to claim 1, wherein a fluororubber of the unvulcanized fluororubber composition (B) contains a copolymer of vinylidene fluoride and other copolymerizable fluorine-containing olefin, and
   the fluorine-containing olefin is at least one kind selected from the group consisting of hexafluoropropene, pentafluoropropene, trifluoroethylene, trifluorochloroethylene, tetrafluoroethylene, vinyl fluoride, perfluoromethyl vinyl ether and perfluoropropyl vinyl ether.

* * * * *